United States Patent
Gorman et al.

(10) Patent No.: US 7,378,159 B2
(45) Date of Patent: May 27, 2008

(54) PROTECTED ARTICLE HAVING A LAYERED PROTECTIVE STRUCTURE OVERLYING A SUBSTRATE

(75) Inventors: Mark Daniel Gorman, West Chester, OH (US); Ramgopal Darolia, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/922,488

(22) Filed: Aug. 20, 2004

(65) Prior Publication Data

US 2006/0040128 A1    Feb. 23, 2006

(51) Int. Cl.
    *B32B 15/04*    (2006.01)
(52) U.S. Cl. .............. 428/670; 428/628; 428/632; 428/669; 416/241 B
(58) Field of Classification Search .......... 428/670, 428/650, 669, 628, 632; 416/241 B
    See application file for complete search history.

(56) References Cited

U.S. PATENT DOCUMENTS

| 5,399,313 | A | * | 3/1995 | Ross et al. ............... 420/448 |
| 5,427,866 | A | * | 6/1995 | Nagaraj et al. ............ 428/670 |
| 5,500,252 | A |   | 3/1996 | Meelu et al. |
| 5,763,107 | A |   | 6/1998 | Rickerby et al. |
| 6,296,447 | B1 |  | 10/2001 | Rigney et al. |
| 6,413,584 | B1 |  | 7/2002 | Wustman et al. |
| 6,558,813 | B2 |  | 5/2003 | Darolia |
| 6,607,611 | B1 |  | 8/2003 | Darolia |
| 6,630,250 | B1 |  | 10/2003 | Darolia |
| 6,720,088 | B2 | * | 4/2004 | Zhao et al. ............... 428/615 |
| 6,746,782 | B2 | * | 6/2004 | Zhao et al. ............... 428/632 |
| 6,861,157 | B2 | * | 3/2005 | Zhao et al. ............... 428/632 |

FOREIGN PATENT DOCUMENTS

GB    EP0718419 A2    6/1996

* cited by examiner

*Primary Examiner*—John J. Zimmerman
*Assistant Examiner*—Aaron Austin
(74) *Attorney, Agent, or Firm*—McNees Wallace & Nurick, LLC

(57) ABSTRACT

A protected article has a substrate and a protective structure overlying a surface of the substrate. The protective structure includes a protective layer overlying the surface of the substrate and having an aluminum content greater than that of the substrate, and a bond-coat layer of a bond-coat-layer metal. The bond-coat-layer metal has a bond-coat initial composition having at least about 60 percent by weight platinum, rhodium, palladium, or combinations thereof. There may be a diffusion-barrier layer between the surface of the substrate and the protective layer, and there may be a ceramic thermal barrier coating overlying the bond-coat layer.

21 Claims, 3 Drawing Sheets

PROTECTED ARTICLE HAVING A LAYERED PROTECTIVE STRUCTURE OVERLYING A SUBSTRATE

This invention relates to the protection of surfaces from excessive oxidation using an aluminum-containing protective layer and, more particularly, to the prevention of excessive oxidation of the protective layer.

BACKGROUND OF THE INVENTION

In an aircraft gas turbine (jet) engine, air is drawn into the front of the engine, compressed by a shaft-mounted compressor, and mixed with fuel. The mixture is burned, and the hot exhaust gases are passed through a turbine mounted on the same shaft. The flow of combustion gas turns the turbine by impingement against an airfoil section of the turbine blades and vanes, which turns the shaft and provides power to the compressor and fan. In a more complex version of the gas turbine engine, the compressor and a high pressure turbine are mounted on one shaft, and the fan and low pressure turbine are mounted on a separate shaft. The hot exhaust gases flow from the back of the engine, driving it and the aircraft forward.

The hotter the combustion and exhaust gases, the more efficient is the operation of the jet engine. There is thus an incentive to raise the combustion and exhaust-gas temperatures. The maximum temperature of the combustion gases is normally limited by the materials used to fabricate the turbine vanes and turbine blades of the turbine, upon which the hot combustion gases impinge. In current engines, the turbine vanes and blades are made of nickel-based superalloys, and can operate at temperatures of up to about 1900-2150° F.

Many approaches have been used to increase the operating temperature limits of turbine blades, turbine vanes, and other hot-section components to their current levels. For example, the composition and processing of the base materials themselves have been improved, and a variety of solidification techniques have been developed to take advantage of oriented grain structures and single-crystal structures. Physical cooling techniques may also be used.

In another approach, coatings are applied to the surface of the base metal substrate to inhibit the oxidation of the base metal, thereby permitting the base metal substrate to be used at a higher temperature than would otherwise be possible. The most widely used coatings are aluminum-rich layers whose surfaces oxidize to an aluminum oxide scale to inhibit further oxidation. The aluminum-rich layer may serve as either an environmental coating or as a bond coat under a ceramic thermal barrier coating. Other types of coatings have also been used, although with less-satisfactory results.

Coatings continue to be used to protect substrates, but there is always a need for further improvements to increase the operating temperatures of the coated substrates and to prolong their service lives. The present invention fulfills this need, and further provides related advantages.

SUMMARY OF THE INVENTION

The present invention provides a protected article with an improved layered protective structure. A metallic portion of the protective structure has a top surface that is resistant to oxidation, so that the nature of the bonding contact to an overlying ceramic thermal barrier coating remains stable and provides long life. An underlying aluminum-rich layer protects the substrate from oxidation by oxygen that diffuses through the uppermost layer. Optionally, a diffusion barrier at the surface of the substrate prevents interdiffusion of the remainder of the protective structure and the substrate.

A protected article comprises a substrate having a substrate aluminum content, and a protective structure overlying a surface of the substrate. The protective structure comprises a protective layer overlying the surface of the substrate and having a protective-layer aluminum content greater than the substrate aluminum content. Preferably, the protective-layer aluminum content is greater than the substrate aluminum content by at least 3 atomic percent aluminum. The protective structure further includes a bond-coat layer of a bond-coat-layer metal having a bond-coat initial composition comprising at least about 60 percent by weight of an element selected from the group consisting of platinum, rhodium, palladium, and combinations thereof. The bond-coat layer overlies the protective layer so that the protective layer lies between the bond-coat layer and the surface of the substrate. There may also be a diffusion-barrier layer, as of a metal such as a refractory metal, between the surface of the substrate and the protective layer. A ceramic thermal barrier coating may overlie the bond-coat layer.

Preferably, the substrate is a nickel-base alloy such as a nickel-base superalloy. The protective layer may be a diffusion aluminide layer or an aluminum-containing overlay layer.

The bond-coat initial composition has at least about 60 percent by weight of platinum, rhodium, palladium, and combinations thereof. However, not all platinum-group metals are useful in the present approach.

The bond-coat initial composition may be pure platinum, rhodium, palladium, or a combination of these elements. The bond-coat initial composition may be an alloy of one or more of platinum, rhodium, and palladium with other elements, such as iridium, nickel, chromium, aluminum, zirconium, hafnium, tantalum, rhenium, or ruthenium, or combinations thereof. The other elements are present up to a total of not more than about 40 percent by weight of the bond-coat initial composition. Depending upon the presence, thickness, and nature of the diffusion-barrier layer, the bond-coat layer may be an alloy of the bond-coat initial composition and elements interdiffused into the bond-coat layer from the substrate and from the protective layer. Thus, for example, the bond-coat layer may be an alloy of the bond-coat initial composition and elements interdiffused into the bond-coat layer from the substrate and/or from the protective layer by heat treating for a time of at least 1 hour and at a temperature of at least 1850° F.

The bond-coat layer preferably has a thickness of from about 10 micrometers to about 100 micrometers, more preferably from about 12 micrometers to about 40 micrometers. It is also preferred that the bond-coat layer has a thickness of at least about 25 percent of the thickness of the protective layer.

In another embodiment, a protected article comprises a substrate made of a nickel-base superalloy, and a protective structure overlying a surface of the substrate. The protective structure comprises a diffusion-barrier layer overlying the surface of the substrate. The diffusion-barrier layer preferably comprises at least about 50 percent by weight of an element selected from the group consisting of rhenium, ruthenium, iridium, tungsten, and combinations thereof; a protective layer having more aluminum than the substrate, and preferably at least 3 atomic percent more aluminum than the substrate and overlying the surface of the diffusion-barrier layer, so that the diffusion-barrier layer lies between the protective layer and the surface of the substrate; and a bond-coat layer of a bond-coat-layer metal having a bond-coat initial composition comprising at least about 60 percent by weight of an element selected from the group consisting of platinum, rhodium, palladium, and combinations thereof. The bond-coat layer overlies the protective layer so that the protective layer lies between the bond-coat layer and the surface of the substrate. Other compatible features discussed herein may be utilized with this embodiment.

The present approach provides a protected article in which the bond-coat layer including platinum, rhodium, and/or palladium provides an oxidation-resistant surface. In the absence of an underlying protective layer, oxygen diffuses through the bond-coat layer and results in oxidation below the oxidation-resistant bond coat. The protective layer is tolerant to oxygen and, depending upon compositions and thicknesses of layers, forms either a stable slow-growing oxide or provides a limited amount of aluminum to the bond coat surface so that the aluminum oxide layer forms on the top surface of the protective layer and at least partially seals off further oxygen ingress.

The low rate of diffusion of the oxygen to the protective layer ensures that the aluminum oxide scale does not thicken too rapidly so as to tend to spall during thermal cycling. Additionally, the ceramic thermal barrier coating, where present, contacts the surface of the bond-coat layer, which does not change appreciably during extended periods of service. The bond-coat layer of the present approach has a reasonably good match of the coefficient of thermal expansion with that of the ceramic thermal barrier coating, when present, reducing thermal expansion strains and stresses and the tendency to spallation failures. The optional diffusion-barrier layer reduces the diffusion of elements from the protective layer into the substrate, which could lead to problems such as the formation of a secondary reaction zone (SRZ) in advanced nickel-base superalloys. The diffusion-barrier layer also reduces the diffusion of elements from the substrate into the protective layer, which would alter its properties.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
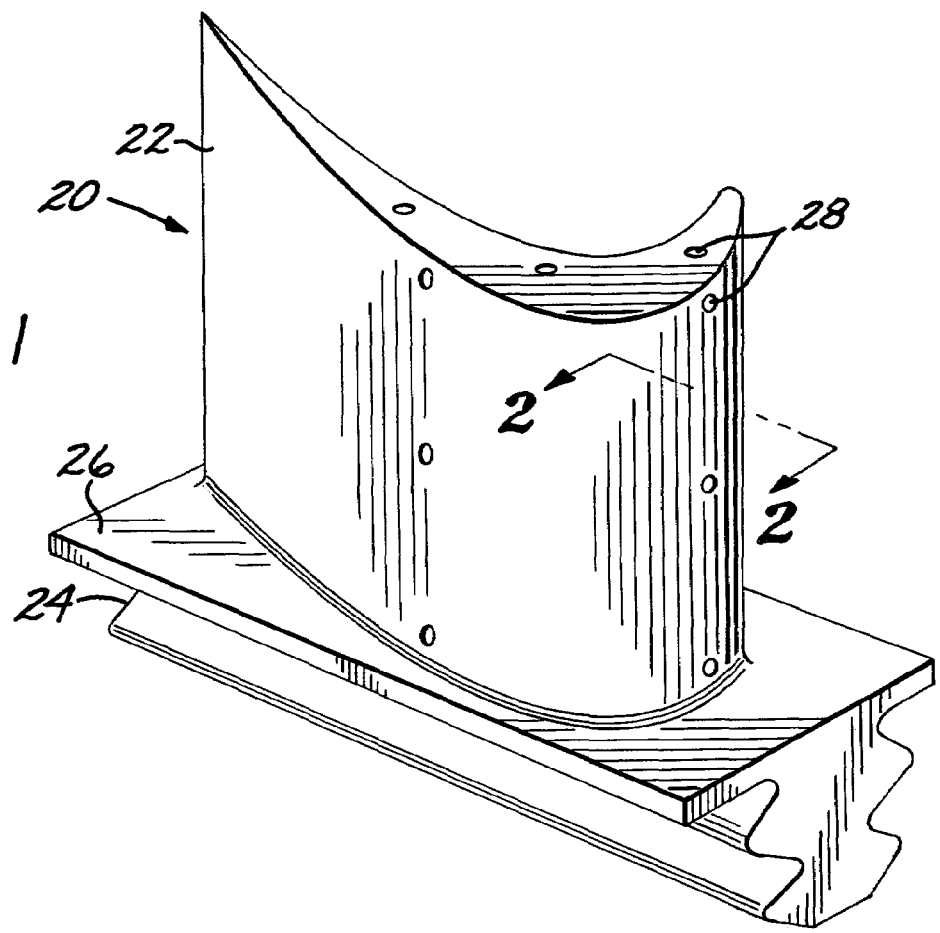
FIG. 1 is a perspective view of a turbine blade.

FIG. 1 depicts a component article of a gas turbine engine such as a turbine blade or a turbine vane, and in this illustration a turbine blade 20. The turbine blade 20 is formed of any operable material, but is preferably a nickel-base superalloy. The turbine blade 20 includes an airfoil section 22 against which the flow of hot exhaust gas is directed. (The turbine vane has a similar appearance in respect to the pertinent airfoil section, but typically includes other end structure to support the airfoil.) The turbine blade 20 is mounted to a turbine disk (not shown) by a dovetail 24 which extends downwardly from the airfoil 22 and engages a slot on the turbine disk. A platform 26 extends longitudinally outwardly from the area where the airfoil 22 is joined to the dovetail 24. Optionally, a number of internal passages extend through the interior of the airfoil 22, ending in openings 28 in the surface of the airfoil 22. During service, a flow of cooling air is directed through the internal passages to reduce the temperature of the airfoil 22.

Figure 2:
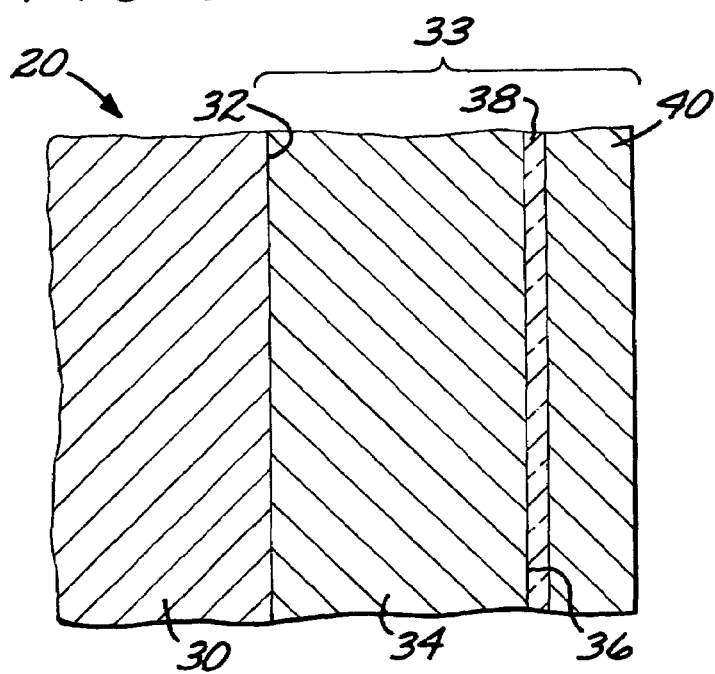
FIG. 2 is an enlarged schematic sectional view through the turbine blade of FIG. 1, taken on lines 2-2.
Figure 3:
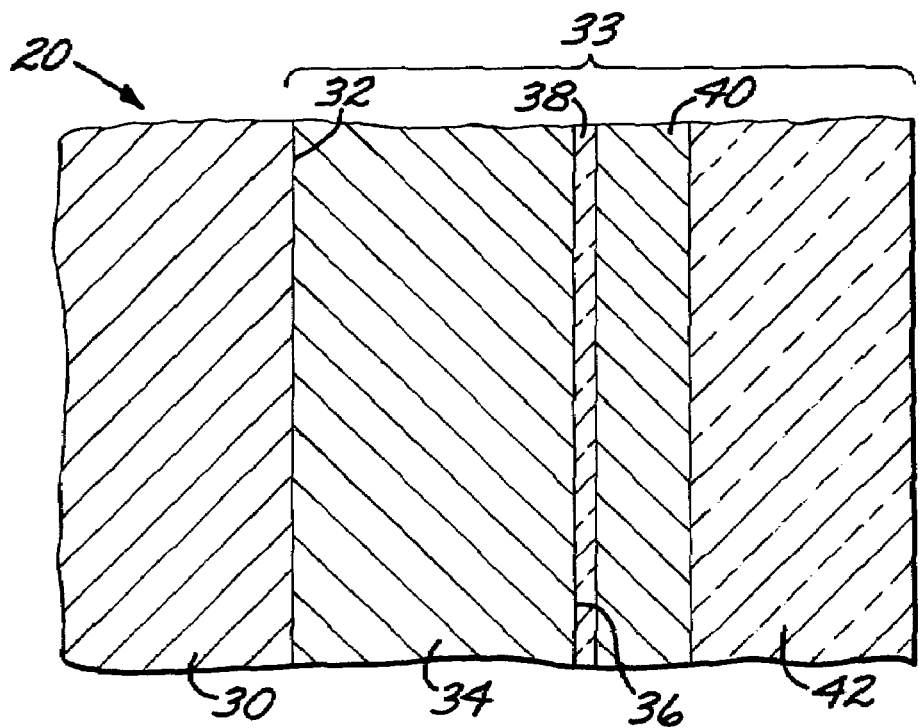
FIG. 3 is a schematic sectional view like that of FIG. 2, illustrating a second embodiment.

FIG. 2 is a sectional view through a portion of the turbine blade 20, here the airfoil section 22. The turbine blade 20 has a body that serves as a substrate 30 with a surface 32. Overlying and contacting the surface 32 is a protective structure 33 including a protective layer 34. The protective layer 34 has a greater amount of aluminum than the substrate, and preferably at least 3 atomic percent aluminum greater than the substrate. That is, the protective-layer aluminum content is preferably at least 3 atomic percent greater than the substrate aluminum content. To cite an example, if the substrate has an aluminum content of 12 atomic percent aluminum, the protective layer 34 has an aluminum content of greater than 12 atomic percent, and preferably greater than 15 atomic percent. The protective layer 34 overlies the surface of the substrate 30 and may be of any operable type. In the embodiments of FIGS. 2 and 3, the protective layer 34 contacts the surface 32 of the substrate 30.

Any of several types of protective layer 34 may be used. The protective layer 34 may be a diffusion aluminide that initially includes only aluminum and elements diffused into the protective layer 34 from the substrate 30, or may be a modified diffusion aluminide that initially includes other elements such as platinum, chromium, zirconium, silicon, and/or hafnium. In the simple diffusion aluminide, aluminum is deposited onto the surface 32 and diffused into the surface 32 and interdiffused with the elements of the substrate 30. The modified diffusion aluminide may be formed by depositing a layer of another element, such as platinum, onto the surface 32, and then depositing the aluminum layer (either pure aluminum or doped with a modifying element) overlying the layer of the other element. The layers are interdiffused with the base metal of the substrate. In these cases, the aluminum-containing protective layer 34 may contain a modifying element such as hafnium, yttrium, zirconium, chromium, or silicon, or combinations thereof. Diffusion aluminide coatings that may be used are described in U.S. Pat. No. 6,607,611, whose disclosure is incorporated by reference in its entirety.

The protective layer 34 may instead be an MCrAlX overlay coating, which is also described in the '611 patent. The terminology "MCrAlX" is a shorthand term of art for a variety of families of overlay protective layers 34 that may be employed as environmental coatings or bond coats in thermal barrier coating systems. In this and other forms, M refers to nickel, cobalt, iron, and combinations thereof. In some of these protective layers, the chromium may be omitted. The X denotes elements such as hafnium, zirconium, yttrium, tantalum, rhenium, platinum, silicon, titanium, boron, carbon, and combinations thereof. Specific compositions are known in the art. Some examples of MCrAlX compositions include NiAlCrZr and NiAlZr, but this listing of examples is not to be taken as limiting.

The protective layer 34 is preferably from about 10 to about 75 micrometers thick, but thicker or thinner protective layers 34 may be operable.

For any of these types of elevated-aluminum protective layers 34, an upper surface 36 of the protective layer 34 may oxidize initially during manufacture or during service to form an adherent aluminum oxide scale 38. The aluminum oxide scale 38 is considered to be part of the protective layer 34. This aluminum oxide scale 38 is quite thin, desirably on the order of about 1 to about 5 micrometers in thickness. Alternatively, the protective layer 34 provides a limited level of aluminum to the upper surface of the bond-coat layer so that an adherent aluminum oxide layer forms on the upper surface of the bond-coat layer 40 and at least partially seals off further ingress of oxygen.

Overlying and contacting the protective layer 34 (and the aluminum oxide scale 38, where present) is a bond-coat layer 40. The bond-coat layer 40 has a bond-coat initial composition, upon initial deposition, comprising at least 60 percent by weight of platinum, rhodium, or palladium, or combinations thereof. For example, the initial composition may be at least 60 percent by weight of platinum, or at least 60 percent by weight of the sum of platinum and rhodium. If the bond-coat layer 40 has less than 60 percent by weight of platinum, rhodium, or palladium, or combinations thereof, and depending upon the specific additional elements, the alloying elements likely form non-protective oxides, the thermal-expansion compatibility of the bond-coat layer 40 to the overlying thermal barrier coating may be compromised, and/or undesirable phases that are extremely brittle or have large volume changes may form. The bond-coat layer 40 overlies the protective layer 34 so that the protective layer 34 lies between the bond-coat layer 40 and the surface 32 of the substrate 30.

The bond-coat layer 40 preferably has a thickness of from about 10 to about 100 micrometers, more preferably from about 12 to about 40 micrometers. If the bond-coat layer 40 is thinner than about 10 micrometers, it does not impart sufficient oxygen impermeability. If the bond-coat layer 40 is thicker than about 100 micrometers, it is too heavy and is also wasteful of the expensive constituents. Desirably, the bond-coat layer 40 has a thickness of at least 25 percent of the thickness of the protective layer 34, to prevent the interdiffusion of elements from altering the composition of the bond coat layer 40 by an excessive amount.

FIG. 3 is a schematic sectional view like that of FIG. 2, illustrating a second embodiment. The structure of FIG. 3 is like that of FIG. 2, and the prior description is incorporated here, except that a ceramic thermal barrier coating 42 overlies and contacts the bond-coat layer 40. The ceramic thermal barrier coating 42 is preferably from about 75 to about 400 micrometers thick, most preferably about 125 to about 250 micrometers thick. The ceramic thermal barrier coating 42 is typically yttria-stabilized zirconia, which is zirconium oxide containing from about 3 to about 12 weight percent, preferably from about 4 to about 8 weight percent, of yttrium oxide. Other operable ceramic materials may be used as well. The ceramic thermal barrier coating 42 may be deposited by any operable technique, such as electron beam physical vapor deposition or plasma spray.

Figure 4:
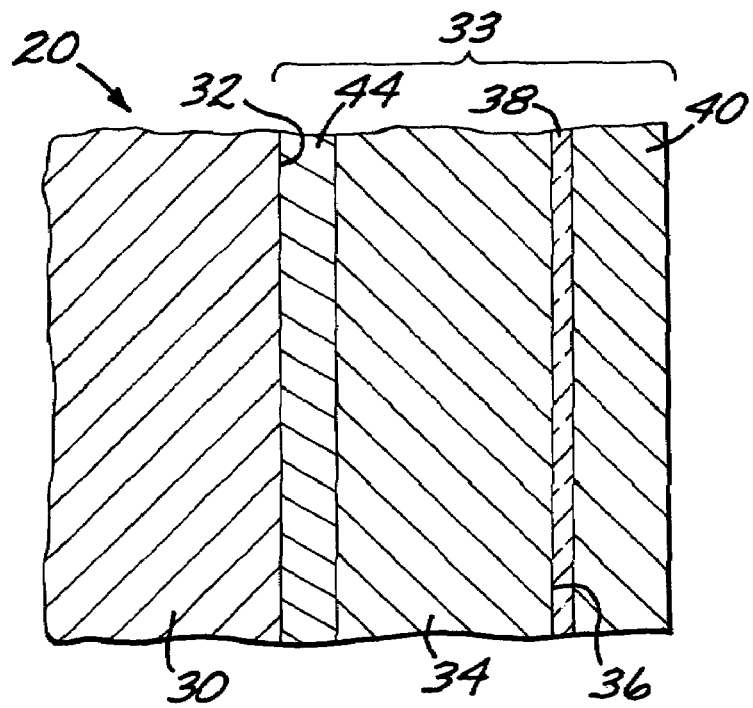
FIG. 4 is a schematic sectional view like that of FIG. 2, illustrating a third embodiment.

FIG. 4 is a schematic sectional view like that of FIG. 2, illustrating a third embodiment. (FIGS. 2-4 are not drawn to scale.) The structure of FIG. 4 is like that of FIG. 2, and the prior description is incorporated here, except that a diffusion-barrier layer 44 overlies and contacts the surface 32 of the substrate 30, and the protective layer 34 overlies and contacts the diffusion-barrier layer 44. That is, the diffusion-barrier layer 44 lies between the protective layer 34 and the substrate 30. The bond-coat layer 40 overlies and contacts the protective layer 34 and, if present, its aluminum oxide scale 38. The diffusion-barrier layer 44 is preferably a refractory pure metal or alloy. Examples of suitable materials for the diffusion-barrier layer 44 include rhenium, iridium, tungsten, and ruthenium, and combinations thereof. The diffusion-barrier layer 44 is preferably from about 3 to about 25 micrometers thick. The diffusion-barrier layer 44 has a low diffusion rate for aluminum found in the protective layer 34, and a low diffusion rate for elements found in the substrate 30. The diffusion-barrier layer 44 thus inhibits the diffusion of elements from the protective layer 34 into the substrate 30, and the diffusion of elements from the substrate 30 into the protective layer 34. Inhibition of diffusion of aluminum from the protective layer 34 into the substrate 30 is desirable to inhibit the formation of a secondary reaction zone (SRZ) in a substrate 30 made of an SRZ-susceptible advanced nickel-base superalloy, and to aid in preventing the reduction of the protective capability of this layer.

Figure 5:
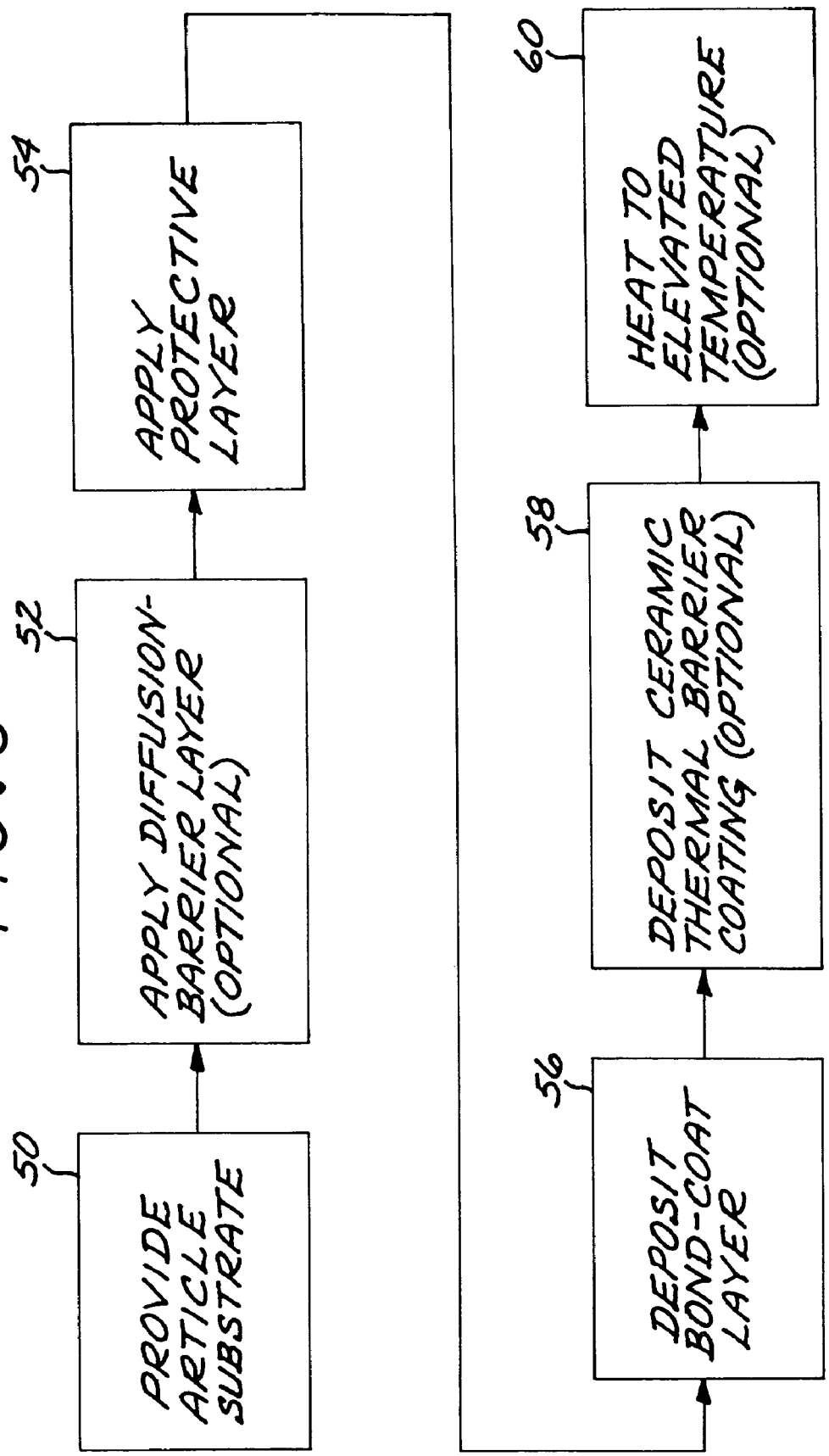
FIG. 5 is a block flow diagram of an approach for preparing a coated gas turbine airfoil.

FIG. 5 is a block flow diagram of a preferred method for practicing the invention. The article substrate 30 is provided, step 50. The article is preferably a component of a gas turbine engine such as a gas turbine blade 20 or vane (or "nozzle", as the vane is sometimes called). The article substrate 30 is most preferably made of a nickel-base superalloy. As used herein, "nickel-base" means that the composition has more nickel present than any other element. The nickel-base superalloys are of a composition that is strengthened by the precipitation of gamma-prime phase or a related phase. The nickel-base alloy preferably has a composition, in weight percent, of from about 4 to about 20 percent cobalt, from about 1 to about 10 percent chromium, from about 5 to about 7 percent aluminum, from 0 to about 2 percent molybdenum, from about 3 to about 8 percent tungsten, from about 4 to about 12 percent tantalum, from 0 to about 2 percent titanium, from 0 to about 8 percent rhenium, from 0 to about 6 percent ruthenium, from 0 to about 1 percent niobium, from 0 to about 0.1 percent carbon, from 0 to about 0.01 percent boron, from 0 to about 0.1 percent yttrium, from 0 to about 1.5 percent hafnium, balance nickel and incidental impurities.

A most preferred alloy composition is Rene' N5, which has a nominal composition in weight percent of about 7.5 percent cobalt, about 7 percent chromium, about 6.2 percent aluminum, about 6.5 percent tantalum, about 5 percent tungsten, about 1.5 percent molybdenum, about 3 percent rhenium, about 0.05 percent carbon, about 0.004 percent boron, about 0.15 percent hafnium, up to about 0.01 percent yttrium, balance nickel and incidental impurities. Other operable superalloys include, for example, Rene' N6, which has a nominal composition in weight percent of about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.15 percent hafnium, about 0.05 percent carbon, about 0.004 percent boron, about 0.01 percent yttrium, balance nickel and incidental impurities; Rene 142, which has a nominal composition, in weight percent, of about 12 percent cobalt, about 6.8 percent chromium, about 1.5 percent molybdenum, about 4.9 percent tungsten, about 6.4 percent tantalum, about 6.2 percent aluminum, about 2.8 percent rhenium, about 1.5 percent hafnium, about 0.1 percent carbon, about 0.015 percent boron, balance nickel and incidental impurities; CMSX-4, which has a nominal composition in weight percent of about 9.60 percent cobalt, about 6.6 percent chromium, about 0.60 percent molybdenum, about 6.4 percent tungsten, about 3.0 percent rhenium, about 6.5 percent tantalum, about 5.6 percent aluminum, about 1.0 percent titanium, about 0.10 percent hafnium, balance nickel and incidental impurities; CMSX-10, which has a nominal composition in weight percent of about 7.00 percent cobalt, about 2.65 percent chromium, about 0.60 percent molybdenum, about 6.40 percent tungsten, about 5.50 percent rhenium, about 7.5 percent tantalum, about 5.80 percent aluminum, about 0.80 percent titanium, about 0.06 percent hafnium, about 0.4 percent niobium, balance nickel and incidental impurities; PWA1480, which has a nominal composition in weight percent of about 5.00 percent cobalt, about 10.0 percent chromium, about 4.00 percent tungsten, about 12.0 percent tantalum, about 5.00 percent aluminum, about 1.5 percent titanium, balance nickel and incidental impurities; PWA1484, which has a nominal composition in weight percent of about 10.00 percent cobalt, about 5.00 percent chromium, about 2.00 percent molybdenum, about 6.00 percent tungsten, about 3.00 percent rhenium, about 8.70 percent tantalum, about 5.60 percent aluminum, about 0.10 percent hafnium, balance nickel and incidental impurities; and MX-4, which has a nominal composition as set forth in U.S. Pat. No. 5,482,789, in weight percent, of from about 0.4 to about 6.5 percent ruthenium, from about 4.5 to about 5.75 percent rhenium, from about 5.8 to about 10.7 percent tantalum, from about 4.25 to about 17.0 percent cobalt, from 0 to about 0.05 percent hafnium, from 0 to about 0.06 percent carbon, from 0 to about 0.01 percent boron, from 0 to about 0.02 percent yttrium, from about 0.9 to about 2.0 percent molybdenum, from about 1.25 to about 6.0 percent chromium, from 0 to about 1.0 percent niobium, from about 5.0 to about 6.6 percent aluminum, from 0 to about 1.0 percent titanium, from about 3.0 to about 7.5 percent tungsten, and wherein the sum of molybdenum plus chromium plus niobium is from about 2.15 to about 9.0 percent, and wherein the sum of aluminum plus titanium plus tungsten is from about 8.0 to about 15.1 percent, balance nickel and incidental impurities. The use of the present invention is not limited to these preferred alloys, and has broader applicability.

The diffusion-barrier layer 44 is optionally applied, step 52. The application technique depends upon the material of the diffusion-barrier layer 44, but is typically sputtering, cathodic arc deposition, electroplating, or a similar process, or a combination of these processes.

The protective layer 34 is applied, step 54. In the preferred case of a diffusion aluminide protective layer 34, the aluminum layer is deposited by any operable approach, with vapor deposition preferred. In that approach, a halide activator gas, such as ammonium chloride, is contacted with aluminum metal or an aluminum alloy to form the corresponding aluminum halide gas. Any modifying elements may be doped into the aluminum layer from a corresponding gas, if desired. The aluminum halide gas contacts the substrate 30, depositing the aluminum thereon. The deposition occurs at elevated temperature such as from about 1700° F. to about 2000° F. so that the deposited aluminum atoms interdiffuse into the substrate 30 during a 4 to 20 hour cycle. This technique allows alloying elements to be deposited into the aluminum layer if desired, from the halide gas.

If the protective layer is a platinum (or palladium or rhodium) aluminide, a first coating layer is deposited onto the surface 32 of the substrate 30 (or the surface of the diffusion-barrier layer 44, if present) before the aluminum-containing layer is deposited. This first coating is preferably deposited by electrodeposition. For the preferred platinum deposition, the deposition is preferably accomplished by placing a platinum-containing solution into a deposition tank and depositing platinum from the solution onto the substrate 30. An operable platinum-containing aqueous solution is $Pt(NH_3)_4HPO_4$ having a concentration of about 4-20 grams per liter of platinum, and the voltage/current source is operated at about ½-10 amperes per square foot of facing article surface. The platinum first coating layer, which is preferably from about 2 to about 8 micrometers thick and most preferably about 5 micrometers thick, is deposited in 1-4 hours at a temperature of 190-200° F.

In the case of the MCrAlX overlay protective layer 34, the protective layer 34 is deposited by any operable physical vapor deposition technique, such as sputtering, cathodic arc or electron beam, or any plasma spray technique such as atmospheric plasma spray (APS) or low pressure plasma spray (LPPS).

The bond-coat layer 40 is deposited overlying and contacting the protective layer 34 (including its aluminum oxide scale 38), step 56. The bond-coat layer 40 is preferably deposited by electrodeposition. Electroplating techniques for depositing layers of platinum, rhodium, palladium, and their alloys are known in the art for other purposes and are similar to that discussed above for platinum.

The ceramic thermal barrier coating 42 is optionally applied, step 58. The application of the ceramic thermal barrier coating is preferably accomplished by electron beam physical vapor deposition or plasma spray.

The article, such as the coated turbine blade 20, is thereafter optionally heated to an elevated temperature, step 60. The heating step 60 may be as part of a pre-service heat treatment, or it may occur during service. During the heating step 60, the protected article is typically heated to a temperature of at least 1850° F., for a time of at least 1 hour. The result is some interdiffusion of elements between the substrate 30 and the various layers 44, 34, and 40.

The present approach has been reduced to practice. A specimen made of Rene™ N5 alloy was overlay coated with NiAlCrZr overlay coating as the aluminum-rich protective layer 34 about 50 micrometers thick. A platinum-rhodium bond-coat layer 40 was electroplated onto the protective layer 34 in a thickness of about 40 micrometers. In a planned extension of this reduction, a zirconia-7 percent yttria ceramic thermal barrier coating 42 about 150 micrometers thick will be deposited onto the bond-coat layer 40 by electron beam physical vapor deposition.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A protected article, comprising:
   a substrate having a substrate aluminum content; and
   a protective structure overlying a surface of the substrate, the protective structure comprising
      a diffusion-aluminide protective layer overlying and contacting the surface of the substrate and having a protective-layer aluminum content greater than the substrate aluminum content by at least 3 atomic percent aluminum, and
      a bond-coat layer of a bond-coat-layer metal having a bond-coat initial composition comprising at least about 60 percent by weight of an element selected from the group consisting of platinum, rhodium, palladium, and combinations thereof, wherein the bond-coat layer overlies and contacts the diffusion aluminide protective layer so that the diffusion-aluminide protective layer lies between the bond-coat layer and the surface of the substrate.

2. The protected article of claim 1, wherein the protective structure further includes
a yttria-stabilized zirconia ceramic thermal barrier coating overlying the bond-coat layer.

3. The protected article of claim 1, wherein the substrate is a nickel-base alloy.

4. The protected article of claim 1, wherein the substrate is a nickel-base superalloy.

5. The protected article of claim 1, wherein the bond-coat layer has a thickness of from about 10 micrometers to about 100 micrometers.

6. The protected article of claim 1, wherein the bond-coat layer has a thickness of from about 12 micrometers to about 40 micrometers.

7. The protected article of claim 1, wherein the bond-coat layer has a thickness of at least 25 percent of the thickness of the diffusion-aluminide protective layer.

8. The protected article of claim 1, wherein the bond-coat initial composition further includes at least one element selected from the group consisting of iridium, chromium, nickel, aluminum, zirconium, hafnium, tantalum, rhenium, and ruthenium.

9. The protected article of claim 1, wherein the bond-coat layer is an alloy of the bond-coat initial composition and elements interdiffused into the bond-coat layer from the substrate and from the diffusion-aluminide protective layer.

10. The protected article of claim 1, wherein the bond-coat layer is an alloy of the bond-coat initial composition and elements interdiffused into the bond-coat layer from the substrate and from the diffusion-aluminide protective layer for a time of at least 1 hour and at a temperature of at least 1850° F.

11. A protected article, comprising:
a nickel-base superalloy substrate having a substrate aluminum content; and
a protective structure overlying a surface of the substrate, the protective structure comprising
a protective layer overlying the surface of the substrate and having a protective-layer aluminum content greater than the substrate aluminum content,
a diffusion-barrier layer overlying and contacting the surface of the substrate so that the diffusion-barrier layer lies between the surface of the substrate and the protective layer, wherein the diffusion-barrier layer comprises at least about 50 percent by weight of an element selected from the group consisting of rhenium, ruthenium, tungsten, and iridium; and
a bond-coat layer of a bond-coat-layer metal having a bond-coat initial composition comprising at least about 60 percent by weight of an element selected from the group consisting of platinum, rhodium, palladium, and combinations thereof, wherein the bond-coat layer overlies the protective layer so that the protective layer lies between the bond-coat layer and the surface of the substrate.

12. The protected article of claim 11, wherein the protective structure further includes
a yttria-stabilized zirconia ceramic thermal barrier coating overlying the bond-coat layer.

13. The protected article of claim 11, wherein the protective-layer aluminum content is greater than the substrate aluminum content by at least 3 atomic percent aluminum.

14. The protected article of claim 11, wherein the protective structure further includes
an aluminum oxide scale on an upper surface of the protective layer, so that the aluminum oxide scale lies between the protective layer and the bond-coat layer.

15. A protected article, comprising:
a substrate having a substrate aluminum content; and
a protective structure overlying a surface of the substrate, the protective structure comprising
a protective layer overlying the surface of the substrate and having a protective-layer aluminum content at least 3 atomic percent greater than the substrate aluminum content, and
a bond-coat layer of a bond-coat-layer metal having a bond-coat initial composition comprising at least about 60 percent by weight of an element selected from the group consisting of platinum, rhodium, palladium, and combinations thereof, wherein the bond-coat layer has a thickness of at least 25 percent of the thickness of the protective layer, and wherein the bond-coat layer overlies the protective layer so that the protective layer lies between the bond-coat layer and the surface of the substrate.

16. The protected article of claim 15, wherein the protective structure further includes
an aluminum oxide scale on an upper surface of the protective layer, so that the aluminum oxide scale lies between the protective layer and the bond-coat layer.

17. A protected article, comprising:
a substrate having a substrate aluminum content; and
a protective structure overlying a surface of the substrate, the protective structure comprising
a protective layer overlying the surface of the substrate and having a protective-layer aluminum content greater than the substrate aluminum content by at least 3 atomic percent aluminum, and
a bond-coat layer of a bond-coat-layer metal having a bond-coat initial composition consisting of at least about 60 percent by weight of an element selected from the group consisting of platinum, rhodium, palladium, and combinations thereof, and at least one element selected from the group consisting of iridium, chromium, nickel, zirconium, hafnium, tantalum, rhenium, and ruthenium, wherein the bond-coat layer overlies the protective layer so that the protective layer lies between the bond-coat layer and the surface of the substrate.

18. The protected article of claim 17, wherein the protective structure further includes
an aluminum oxide scale on an upper surface of the protective layer, so that the aluminum oxide scale lies between the protective layer and the bond-coat layer.

19. A protected article, comprising:
a substrate having a substrate aluminum content; and
a protective structure overlying a surface of the substrate, the protective structure comprising
a protective layer overlying the surface of the substrate and having a protective-layer aluminum content greater than the substrate aluminum content,
a diffusion-barrier layer between the surface of the substrate and the protective layer and contacting the surface of the substrate; and
a bond-coat layer of a bond-coat-layer metal having a bond-coat initial composition comprising at least about 60 percent by weight of an element selected from the group consisting of platinum, rhodium, palladium, and combinations thereof, wherein the bond-coat layer overlies the protective layer so that the protective layer lies between the bond-coat layer and the surface of the substrate.

20. The protected article of claim 19, wherein the diffusion-barrier layer comprises at least about 50 percent by weight of an element selected from the group consisting of rhenium, ruthenium, tungsten, iridium, and combinations thereof.

21. The protected article of claim 19, wherein the protective structure further includes an aluminum oxide scale on an upper surface of the protective layer, so that the aluminum oxide scale lies between the protective layer and the bond-coat layer.

* * * * *